United States Patent
Matsubara et al.

(10) Patent No.: US 12,434,969 B2
(45) Date of Patent: Oct. 7, 2025

(54) LITHIUM NITRIDE COMPOSITION FOR SULFIDE-BASED INORGANIC SOLID ELECTROLYTE MATERIAL

(71) Applicant: FURUKAWA CO., LTD., Tokyo (JP)

(72) Inventors: Tetsuya Matsubara, Tsukuba (JP); Tatsushi Yoshida, Tsukuba (JP); Motoshi Tamura, Tsukuba (JP); Kazutomi Yamamoto, Tsukuba (JP)

(73) Assignee: FURUKAWA CO., LTD., Tokyo (JP)

( * ) Notice: Subject to any disclaimer, the term of this patent is extended or adjusted under 35 U.S.C. 154(b) by 872 days.

(21) Appl. No.: 17/598,586

(22) PCT Filed: Mar. 6, 2020

(86) PCT No.: PCT/JP2020/009706
§ 371 (c)(1),
(2) Date: Sep. 27, 2021

(87) PCT Pub. No.: WO2020/203046
PCT Pub. Date: Oct. 8, 2020

(65) Prior Publication Data
US 2022/0081296 A1   Mar. 17, 2022

(30) Foreign Application Priority Data
Mar. 29, 2019  (JP) ................. 2019-066564

(51) Int. Cl.
*H01M 10/0525* (2010.01)
*C01B 21/06* (2006.01)
*H01M 10/0562* (2010.01)

(52) U.S. Cl.
CPC ....... *C01B 21/061* (2013.01); *H01M 10/0525* (2013.01); *H01M 10/0562* (2013.01); *C01P 2002/72* (2013.01); *H01M 2300/0068* (2013.01)

(58) Field of Classification Search
CPC ......... H01M 10/0525; H01M 10/0562; H01M 2300/0068; C01P 2002/72
See application file for complete search history.

(56) References Cited

U.S. PATENT DOCUMENTS 4,234,554 A  11/1980  Rabenau et al.
5,958,281 A * 9/1999  Takada ................ H01M 6/18
                                                     423/561.1
(Continued)

FOREIGN PATENT DOCUMENTS

JP     57-141874 A    9/1982
JP     2011-178652 A  9/2011
(Continued)

OTHER PUBLICATIONS

International Search Report (ISR) dated Jun. 2, 2020 filed in PCT/JP2020/009706.
(Continued)

*Primary Examiner* — Osei K Amponsah
(74) *Attorney, Agent, or Firm* — WHDA, LLP (57) ABSTRACT

Provided is a lithium nitride composition for a sulfide-based inorganic solid electrolyte material including α-lithium nitride, wherein in a spectrum obtained by X-ray diffraction in which a CuKα ray is used as a radiation source, when a diffraction intensity of a diffraction peak present at a position of a diffraction angle 2θ=23.0±0.3° is represented by $I_\alpha$ and a diffraction intensity of a diffraction peak present at a position of a diffraction angle 2θ=32.0±0.3° is represented by $I_\beta$, a value of $I_\beta/I_\alpha$ is 4.50 or lower.

6 Claims, 1 Drawing Sheet

(56) References Cited

U.S. PATENT DOCUMENTS

| | | | |
|---|---|---|---|
| 9,309,120 B2 | 4/2016 | Suzuki et al. | |
| 10,461,363 B2 | 10/2019 | Kanno et al. | |
| 2012/0225005 A1* | 9/2012 | Suzuki | C01B 21/0602 423/409 |
| 2013/0316238 A1* | 11/2013 | Nishimura | H01M 4/42 429/219 |
| 2017/0155168 A1 | 6/2017 | Kanno et al. | |

FOREIGN PATENT DOCUMENTS

| | | |
|---|---|---|
| JP | 2016-27545 A | 2/2016 |
| JP | 2017-054633 A | 3/2017 |
| JP | 2018-049731 A | 3/2018 |

OTHER PUBLICATIONS

Office Action dated Oct. 16, 2023, issued in counterpart KR Application No. 10-2021-7034039. (5 pages).

Minella, C., Synthesis of LiNH2 + LiH by reactive milling of Li3N, The Royal Society of Chemistry, Faraday Discuss, p. 253-262, 2011. (10 pages).

Extended (Supplementary) European Search Report dated Dec. 21, 2022, issued in counterpart EP Application No. 20784405.1. (7 pages).

* cited by examiner

LITHIUM NITRIDE COMPOSITION FOR SULFIDE-BASED INORGANIC SOLID ELECTROLYTE MATERIAL

TECHNICAL FIELD

The present invention relates to a lithium nitride composition for a sulfide-based inorganic solid electrolyte material.

BACKGROUND ART

In general, a lithium ion battery is used as a power supply of a small mobile device such as a mobile phone or a laptop. In addition, recently, the lithium ion battery has been used not only as a power supply of a small mobile device but also as a power supply of an electric vehicle, an electric power storage, or the like.

In a currently available lithium ion battery, an electrolytic solution including a combustible organic solvent is used. On the other hand, in a lithium ion battery (hereinafter, also referred to as "all-solid-state lithium ion battery") in which a solid electrolyte is replaced with the electrolytic solution such that the entire battery is made of a solid, a combustible organic solvent is not used in the battery. Therefore, it is considered that a safety device can be simplified and manufacturing costs or productivity is excellent.

As a solid electrolyte material used for the solid electrolyte, for example, a sulfide-based inorganic solid electrolyte material is known.

Patent Document 1 (Japanese Unexamined Patent Publication No. 2016-27545) describes a sulfide-based solid electrolyte material having a peak at a position of $2\theta=29.86°\pm1.00°$ in X-ray diffraction measurement using a CuKα ray and a composition of $Li_{2y+3}PS_4$ ($0.1 \leq y \leq 0.175$).

RELATED DOCUMENT

Patent Document

[Patent Document 1] Japanese Unexamined Patent Publication No. 2016-27545

SUMMARY OF THE INVENTION

Technical Problem

The sulfide-based inorganic solid electrolyte material has excellent electrochemical stability and lithium ionic conductivity, but the lithium ionic conductivity is lower than that of an electrolytic solution.

Therefore, for the sulfide-based inorganic solid electrolyte material used for a lithium ion battery, further improvement of lithium ionic conductivity is required while maintaining electrochemical stability.

The present invention has been made in consideration of the above-described circumstances, and an object thereof is to provide a lithium nitride composition with which the lithium ionic conductivity of the obtained sulfide-based inorganic solid electrolyte material can be improved.

Solution to Problem

The present inventors conducted a thorough investigation in order to provide a sulfide-based inorganic solid electrolyte material with improved lithium ionic conductivity. As a result, the present inventors found that the lithium ionic conductivity of the obtained sulfide-based inorganic solid electrolyte material can be improved by using a lithium nitride composition in which the proportion of α-lithium nitride is high as a raw material for manufacturing a sulfide-based inorganic solid electrolyte material, thereby completing the present invention.

That is, according to the present invention, there is provided a lithium nitride composition for a sulfide-based inorganic solid electrolyte material including α-lithium nitride, in which in a spectrum obtained by X-ray diffraction in which a CuKα ray is used as a radiation source, when a diffraction intensity of a diffraction peak present at a position of a diffraction angle $2\theta=23.0\pm0.3°$ is represented by $I_\alpha$ and a diffraction intensity of a diffraction peak present at a position of a diffraction angle $2\theta=32.0\pm0.3°$ is represented by $I_\beta$, a value of $I_\beta/I_\alpha$ is 4.50 or lower.

In addition, according to the present invention, there is provided a method of manufacturing the above-described lithium nitride composition, the method including:

a step of nitriding lithium foil in a nitrogen gas;

a step of mechanically processing the obtained lithium nitride foil such that the lithium nitride foil is powdery; and a step of annealing the obtained powdery lithium nitride.

In addition, according to the present invention, there is provided a raw material composition of a sulfide-based inorganic solid electrolyte material, the raw material composition including: the above-described lithium nitride composition; lithium sulfide; and phosphorus sulfide.

Further, according to the present invention, there is provided a method of manufacturing a sulfide-based inorganic solid electrolyte material, the method including a step of mechanically processing the above-described raw material composition of the sulfide-based inorganic solid electrolyte material.

Further, according to the present invention, there is provided a sulfide-based inorganic solid electrolyte material that is obtained by using the above-described lithium nitride composition as a raw material.

Further, according to the present invention, there is provided a solid electrolyte including the above-described sulfide-based inorganic solid electrolyte material.

Further, according to the present invention, there is provided a solid electrolyte membrane including the above-described solid electrolyte as a main component.

Further, according to the present invention, there is provided a lithium ion battery including: a positive electrode including a positive electrode active material layer; an electrolyte layer; and a negative electrode including a negative electrode active material layer, in which at least one of the positive electrode active material layer, the electrolyte layer, and the negative electrode active material layer includes the above-described sulfide-based inorganic solid electrolyte material.

Advantageous Effects of Invention

According to the present invention, a lithium nitride composition with which the lithium ionic conductivity of the obtained sulfide-based inorganic solid electrolyte material can be improved.

DESCRIPTION OF EMBODIMENTS

Hereinafter, an embodiment of the present invention will be described using the drawings. In all the drawings, the same components are represented by common reference numerals, and the description thereof will not be repeated. In addition, the diagrams are schematic diagrams, in which a dimensional ratio does not match the actual one. Unless specified otherwise, a numerical range "A to B" represents A or more and B or less.

[Lithium Nitride Composition]

First, a lithium nitride composition according to the present embodiment will be described.

The lithium nitride composition according to the present embodiment is a lithium nitride composition for a sulfide-based inorganic solid electrolyte material (hereinafter, also referred to as "lithium nitride composition"), the lithium nitride composition including α-lithium nitride, in which in a spectrum obtained by X-ray diffraction in which a CuKα ray is used as a radiation source, when a diffraction intensity of a diffraction peak present at a position of a diffraction angle 2θ=23.0±0.3° is represented by $I_\alpha$ and a diffraction intensity of a diffraction peak present at a position of a diffraction angle 2θ=32.0±0.3° is represented by $I_\beta$, a value of $I_\beta/I_\alpha$ is 4.50 or lower.

The upper limit of the value of $I_\beta/I_\alpha$ is preferably 2.00 or lower, more preferably 1.00 or lower, still more preferably 0.50 or lower, still more preferably 0.20 or lower, and still more preferably 0.10 or lower.

By adjusting the value of $I_\beta/I_\alpha$ to be the upper limit value or lower, the lithium ionic conductivity of the obtained sulfide-based inorganic solid electrolyte material can be improved. Further, by using the above-described sulfide-based inorganic solid electrolyte material, an all-solid-state lithium ion battery having excellent input and output characteristics can be obtained.

Here, the diffraction intensity ($I_\alpha$) of the diffraction peak present at the position of the diffraction angle 2θ=23.0±0.3° is a diffraction peak derived from α-lithium nitride, and the diffraction intensity (Ig) of the diffraction peak present at the position of the diffraction angle 2θ=32.0±0.3° is a diffraction peak derived from β-lithium nitride.

Accordingly, the value of $I_\beta/I_\alpha$ is an index representing the content ratio between the α-lithium nitride and the β-lithium nitride in the lithium nitride composition. As the $I_\beta/I_\alpha$ decreases, the content ratio of the β-lithium nitride in the lithium nitride composition decreases, and the content ratio of the α-lithium nitride in the lithium nitride composition increases.

Here, the lithium nitride is a raw material of a sulfide-based inorganic solid electrolyte material and is classified into α phase and β phase in terms of a difference in crystal structure. In the present embodiment, lithium nitride having α phase will be referred to as "α-lithium nitride", and lithium nitride having β phase will be referred to as "β-lithium nitride". α phase is a stable hexagonal crystal phase, and β phase is a metastable phase that is produced at a high pressure.

According to an investigation by the present inventors, it was clarified that the lithium nitride having α phase is produced by leaving lithium foil to stand in nitrogen at room temperature, and when the α-lithium nitride is crushed with a ball mill or the like, the α-lithium nitride may be transformed into β-lithium nitride.

Based on the above-described finding, the present inventors conducted a thorough investigation and found that the lithium ionic conductivity of the obtained sulfide-based inorganic solid electrolyte material can be further improved as the content of the α-lithium nitride increases, thereby completing the present invention.

That is, according to the present embodiment, by adjusting the value of $I_\beta/I_\alpha$ to be the upper limit value or lower, a lithium nitride composition with which the lithium ionic conductivity of the obtained sulfide-based inorganic solid electrolyte material can be improved can be provided.

It is preferable that the value of $I_\beta/I_\alpha$ is as low as possible. Therefore, the lower limit of Iβ/Iα is not particularly limited and may be, for example, 0.001 or higher and 0.01 or higher.

In the present embodiment, the lithium nitride composition in which $I_\beta/I_\alpha$ is in the above-described range can be obtained, for example, by mechanically processing lithium nitride foil such that the lithium nitride foil is powdery and annealing the obtained powdery lithium nitride.

The lithium nitride composition according to the present embodiment includes lithium nitride as a main component. From the viewpoint that the lithium ionic conductivity of the obtained sulfide-based inorganic solid electrolyte material can be further improved, the content of the lithium nitride (the total content of the α-lithium nitride and the β-lithium nitride) in the lithium nitride composition according to the present embodiment is preferably 95 mass % or higher, more preferably 97 mass % or higher, still more preferably 98 mass % or higher, and still more preferably 99 mass % or higher. The upper limit of the content of the lithium nitride in the lithium nitride composition according to the present embodiment is not particularly limited and is, for example, 100 mass % or lower.

Examples of properties of the lithium nitride composition according to the present embodiment include powdery. The sulfide-based inorganic solid electrolyte material described below is generally manufactured through a dry process. Therefore, when the properties of the lithium nitride composition according to the present embodiment are powdery, the sulfide-based inorganic solid electrolyte material is more easily manufactured.

[Method of Manufacturing Lithium Nitride Composition]

Next, a method of manufacturing the lithium nitride composition according to the present embodiment will be described.

The method of manufacturing the lithium nitride composition according to the present embodiment includes, for example, steps (X), (Y), and (Z).

Step (X): a step of nitriding lithium foil in a nitrogen gas

Step (Y): a step of mechanically processing the obtained lithium nitride foil such that the lithium nitride foil is powdery Step (Z): a step of annealing the obtained powdery lithium nitride (Step (X))

First, lithium foil is nitrided in nitrogen gas.

In the method of manufacturing the lithium nitride composition according to the present embodiment, nitrogen gas is used for the nitriding reaction of the lithium foil. The nitrogen gas is easily reactive with lithium and is inexpensive and toxic-free.

It is preferable that the oxygen concentration and the water concentration in the nitrogen gas are as low as possible. As a result, the oxidation corrosion of lithium can be suppressed, and the formation of lithium nitride can be accelerated. In addition, mixing of lithium oxide or lithium hydroxide into lithium nitride can be suppressed.

In addition, the purity of the nitrogen gas is preferably 99.99% or higher.

From the viewpoint of accelerating the formation of the lithium nitride safely and rapidly, the temperature during the nitriding reaction of the lithium foil is preferably in a range of 10° C. or higher and 120° C. or lower and more preferably in a range of 20° C. or higher and 80° C. or lower.

The time for which the nitriding reaction of the lithium foil is performed is, for example, 0.5 hours or longer and 48 hours or shorter.

(Step (Y))

Next, the obtained lithium nitride foil is mechanically processed such that the lithium nitride foil is powdery. A mechanical processing method for the powdery lithium nitride is not particularly limited, and the mechanical processing can be performed using a generally well-known crushing unit.

Examples of a device for performing the mechanical processing include: a crusher and disperser such as a ball mill, a beads mill, a vibrating mill, a turbo mill, a mechanofusion, a disc mill, or a roll mill; a rotation and impact crushing device including a mechanism as a combination of rotation (shearing stress) and impact (compressive stress) represented by a rock drill, a vibration drill, an impact driver, or the like; a high-pressure grinding roll; and a vertical mill such as a roller vertical mill or a ball vertical mill. In particular, from the viewpoint of efficiently generating a very high impact energy, a ball mill or a beads mill is preferable, and a ball mill is more preferable. In addition, from the viewpoint of obtaining excellent continuous productivity, for example, a roll mill; a rotation and impact crushing device including a mechanism as a combination of rotation (shearing stress) and impact (compressive stress) represented by a rock drill, a vibration drill, an impact driver, or the like; a high-pressure grinding roll; or a vertical mill such as a roller vertical mill or a ball vertical mill is preferable.

Mixing conditions such as a rotation speed, a processing time, a temperature, a reaction pressure, or a gravitational acceleration applied to the raw material inorganic composition during the mechanical process of the lithium nitride foil can be appropriately determined based on the amount of the lithium nitride foil processed.

(Step (Z))

Next, the obtained powdery lithium nitride is annealed.

For example, the powdery lithium nitride can be annealed by heating the powdery lithium nitride in an inert gas atmosphere at preferably 200° C. or higher or 500° C. or lower and more preferably 250° C. or higher or 400° C. or lower. As a result, the proportion of the α-lithium nitride in the lithium nitride composition can be increased, and thus the value of $IG/I_\alpha$ can be decreased.

The annealing process of the powdery lithium nitride can be performed until the value of $IR/I\alpha$ is a desired value. The annealing time of the powdery lithium nitride is, for example, 0.5 hours or longer and 24 hours or shorter and preferably 1 hour or longer and 5 hours or shorter.

[Sulfide-Based Inorganic Solid Electrolyte Material]

Hereinafter, the sulfide-based inorganic solid electrolyte material according to the present embodiment will be described.

The sulfide-based inorganic solid electrolyte material according to the present embodiment can be obtained by using the lithium nitride composition according to the present embodiment as a raw material.

From the viewpoint of further improving the electrochemical stability and the stability and the handling properties in water or air, it is preferable that the sulfide-based inorganic solid electrolyte material according to the present embodiment includes Li, P, and S as constituent elements.

In addition, in the sulfide-based inorganic solid electrolyte material according to the present embodiment, from the viewpoint of further improving the lithium ionic conductivity, the electrochemical stability, and the stability and the handling properties in water or air, a molar ratio Li/P of the content of Li to the content of P is preferably 1.0 or higher and 5.0 or lower, more preferably 2.0 or higher and 4.0 or lower, still more preferably 2.5 or higher and 3.8 or lower, still more preferably 2.8 or higher and 3.6 or lower, still more preferably 3.0 or higher and 3.5 or lower, still more preferably 3.1 or higher and 3.4 or lower, and particularly preferably 3.1 or higher and 3.3 or lower, and a molar ratio S/P of the content of S to the content of P is preferably 2.0 or higher and 6.0 or lower, more preferably 3.0 or higher and 5.0 or lower, still more preferably 3.5 or higher and 4.5 or lower, still more preferably 3.8 or higher and 4.2 or lower, still more preferably 3.9 or higher and 4.1 or lower, and particularly preferably 4.0.

Here, the contents of Li, P, and S in the sulfide-based inorganic solid electrolyte material according to the present embodiment can be obtained by, for example, ICP Emission Spectroscopy or X-ray analysis.

In the sulfide-based inorganic solid electrolyte material according to the present embodiment, the lithium ionic conductivity of the sulfide-based inorganic solid electrolyte material measured using an alternating current impedance method under measurement conditions of 27.0° C., an applied voltage of 10 mV, and a measurement frequency range of 0.1 Hz to 7 MHz is preferably $0.5 \times 10^{-3}$ S·cm$^{-1}$ or higher, more preferably $0.6 \times 10^{-3}$ S·cm$^{-1}$ or higher, still more preferably $0.8 \times 10^{-3}$ S·cm$^{-1}$ or higher, and particularly preferably $1.0 \times 10^{-3}$ S·cm$^{-1}$ or higher.

When the lithium ionic conductivity of the sulfide-based inorganic solid electrolyte material according to the present embodiment is the above-described lower limit value or higher, a lithium ion battery having further improved battery characteristics can be obtained. Further, by using the above-described sulfide-based inorganic solid electrolyte material, a lithium ion battery having further improved input and output characteristics can be obtained.

Examples of the shape of the sulfide-based inorganic solid electrolyte material according to the present embodiment include a particle shape.

The sulfide-based inorganic solid electrolyte material having a particle shape according to the present embodiment is not particularly limited, and an average particle size $d_{50}$ in a weight average particle size distribution measured using a laser diffraction scattering particle size distribution method is preferably 1 μm or more and 100 μm or less, more preferably 3 μm or more and 80 μm or less, still more preferably 5 μm or more and 60 μm or less.

By adjusting the average particle size $d_{50}$ of the sulfide-based inorganic solid electrolyte material to be in the above-described range, the lithium ionic conductivity can be further improved while maintaining excellent handling properties.

It is preferable that the sulfide-based inorganic solid electrolyte material according to the present embodiment has excellent electrochemical stability. Here, the electrochemical stability refers to a property in which a material is not likely to be oxidized and reduced in a wide voltage range. More specifically, in the sulfide-based inorganic solid electrolyte material according to the present embodiment, a maximum value of an oxidative decomposition current measured under conditions of temperature of 25° C., a sweep voltage range of 0 to 5 V, and a voltage sweep rate of 5 mV/sec is preferably 0.50 μA or lower, more preferably 0.20 μA or lower, still more preferably 0.10 μA or lower, still more preferably 0.05 μA or lower, and particularly preferably 0.03 μA or lower.

When the maximum value of the oxidative decomposition current in the sulfide-based inorganic solid electrolyte material is the above-described upper limit value or lower, the oxidative decomposition of the sulfide-based inorganic solid electrolyte material in the lithium ion battery can be suppressed, which is preferable.

The lower limit value of the maximum value of the oxidative decomposition current in the sulfide-based inorganic solid electrolyte material is not particularly limited and is, for example, 0.0001 μA or higher.

The sulfide-based inorganic solid electrolyte material according to the present embodiment can be used for any application where lithium ionic conductivity is required. In particular, it is preferable that the sulfide-based inorganic solid electrolyte material according to the present embodiment is used for a lithium ion battery. More specifically, the sulfide-based inorganic solid electrolyte material according to the present embodiment is used for a positive electrode active material layer, a negative electrode active material layer, an electrolyte layer, or the like in a lithium ion battery. Further, the sulfide-based inorganic solid electrolyte material according to the present embodiment is suitably used for a positive electrode active material layer, a negative electrode active material layer, a solid electrolyte layer, or the like forming an all-solid-state lithium ion battery, and is more suitably used for a solid electrolyte layer forming an all-solid-state lithium ion battery.

Examples of the all-solid-state lithium ion battery to which the sulfide-based inorganic solid electrolyte material according to the present embodiment is applied include an all-solid-state lithium ion battery in which a positive electrode, a solid electrolyte layer, and a negative electrode are stacked in this order.

[Method of Manufacturing Sulfide-Based Inorganic Solid Electrolyte Material]

Next, a method of manufacturing the sulfide-based inorganic solid electrolyte material according to the present embodiment will be described.

The method of manufacturing the sulfide-based inorganic solid electrolyte material according to the present embodiment includes, for example, a step of mechanically processing a raw material composition of the sulfide-based inorganic solid electrolyte material including the lithium nitride composition according to the present embodiment, lithium sulfide, and phosphorus sulfide.

More specifically, the sulfide-based inorganic solid electrolyte material according to the present embodiment can be obtained using a manufacturing method including steps (A) and (B) described below. In addition, the method of manufacturing the sulfide-based inorganic solid electrolyte material according to the present embodiment optionally further includes steps (C) and (D) described below.

Step (A): a step of preparing a raw material composition of the sulfide-based inorganic solid electrolyte material including the lithium nitride composition according to the present embodiment, lithium sulfide, and phosphorus sulfide Step (B): a step of obtaining the sulfide-based inorganic solid electrolyte material in the vitreous state by mechanically processing the raw material composition of the sulfide-based inorganic solid electrolyte material such that the lithium nitride composition, the lithium sulfide, and the phosphorus sulfide as raw materials are vitrified in a chemical reaction Step (C): a step of heating the obtained sulfide-based inorganic solid electrolyte material in the vitreous state such that at least a part thereof is crystallized.

Step (D): a step of crushing, classifying, or granulating the obtained sulfide-based inorganic solid electrolyte material (Step (A) of Preparing Raw Material Composition of Sulfide-Based Inorganic Solid Electrolyte Material)

raw material composition of the sulfide-based inorganic solid electrolyte material including the lithium nitride composition according to the present embodiment, lithium sulfide, and phosphorus sulfide as raw materials is prepared. Here, a mixing ratio between the respective raw materials in the raw material composition is adjusted such that the obtained sulfide-based inorganic solid electrolyte material has a desired composition ratio.

A method of mixing the respective raw materials is not particularly limited as long as it is a mixing method capable of uniformly mixing the respective raw materials. For example, the raw materials can be mixed using a ball mill, a beads mill, a vibrating mill, an impact crushing device, a mixer (for example, a pug mixer, a ribbon mixer, a tumbler mixer, a drum mixer, or a V-type mixer), a kneader, a twin-screw kneader, an air flow grinder, a crusher, a rotary blade crusher, or the like.

Mixing conditions such as a stirring rate, a processing time, a temperature, a reaction pressure, or a gravitational acceleration applied to the mixture during the mixing of the respective raw materials can be appropriately determined based on the amount of the mixture processed.

The lithium sulfide used as a raw material is not particularly limited, and a commercially available lithium sulfide may be used. For example, lithium sulfide obtained by reaction of lithium hydroxide and hydrogen sulfide may also be used. From the viewpoint of obtaining the high-purity sulfide-based inorganic solid electrolyte material and suppressing a side reaction, it is preferable that lithium sulfide having little impurities is used.

Here, in the present embodiment, examples of the lithium sulfide include lithium polysulfide. As the lithium sulfide, $Li_2S$ is preferable.

The phosphorus sulfide used as a raw material is not particularly limited. For example, commercially available phosphorus sulfide (for example, $P_2S_5$, $P_4S_3$, $P_4S_7$, or $P_4S_5$) can be used. From the viewpoint of obtaining the high-purity sulfide-based inorganic solid electrolyte material and suppressing a side reaction, it is preferable that phosphorus sulfide having little impurities is used. As the phosphorus sulfide, $P_2S_5$ is preferable.

(Step (B) of Obtaining Sulfide-Based Inorganic Solid Electrolyte Material in Vitreous State)

Next, the sulfide-based inorganic solid electrolyte material in the vitreous state is obtained by mechanically processing the raw material composition of the sulfide-based inorganic solid electrolyte material such that the lithium nitride composition, the lithium sulfide, and the phosphorus sulfide as raw materials are vitrified in a chemical reaction.

Here, the mechanical process refers to a process of causing two or more kinds of inorganic compounds to mechanically collide with each other to be vitrified in a chemical reaction, for example, a mechanochemical process. Here, the mechanochemical process refers to a method of vitrifying a target composition while applying a mechanical energy such as a shear force or an impact force.

In addition, in the step (B), it is preferable that the mechanochemical process is a dry mechanochemical process from the viewpoint of realizing the process in an environment where water or oxygen is removed at a high level.

By using the mechanochemical process, the respective raw materials can be mixed while crushing the raw materials into fine particles. Therefore, the contact area of the respective raw materials can be increased. As a result, the reaction of the respective raw materials can be accelerated. The sulfide-based inorganic solid electrolyte material according to the present embodiment can be obtained with higher efficiency.

Here, the mechanochemical process refers to a method of vitrifying a mixing target while applying a mechanical energy such as a shear force, an impact force, or a centrifugal force. Examples of a device for vitrification (hereinafter, referred to as "vitrification device") in the mechanochemical process include: a crusher and disperser such as a ball mill, a beads mill, a vibrating mill, a turbo mill, a mechanofusion, a disc mill, or a roll mill; a rotation and impact crushing device including a mechanism as a combination of rotation (shearing stress) and impact (compressive stress) represented by a rock drill, a vibration drill, an impact driver, or the like; a high-pressure grinding roll; and a vertical mill such as a roller vertical mill or a ball vertical mill. In particular, from the viewpoint of efficiently generating a very high impact energy, a ball mill or a beads mill is preferable, and a ball mill is more preferable. In addition, from the viewpoint of obtaining excellent continuous productivity, for example, a roll mill; a rotation and impact crushing device including a mechanism as a combination of rotation (shearing stress) and impact (compressive stress) represented by a rock drill, a vibration drill, or an impact driver; a high-pressure grinding roll; or a vertical mill such as a roller vertical mill or a ball vertical mill is preferable.

Mixing conditions such as a rotation speed, a processing time, a temperature, a reaction pressure, or a gravitational acceleration applied to the raw material inorganic composition during the mechanical process of the raw material composition of the sulfide-based inorganic solid electrolyte material can be appropriately determined based on the kind of the raw material inorganic composition or the amount thereof processed. In general, as the rotation speed increases, the glass production rate increases, and as the processing time increases, the glass conversion rate increases.

Typically, when X-ray diffraction analysis is performed using CuKα rays as a radiation source, if a diffraction peak derived from the raw material is lost or decreases, it can be determined that the raw material composition of the sulfide-based inorganic solid electrolyte material is vitrified and a desired sulfide-based inorganic solid electrolyte material is obtained.

Here, in the step (B), it is preferable that the vitrification process is performed until the lithium ionic conductivity of the sulfide-based inorganic solid electrolyte material measured using an alternating current impedance method under measurement conditions of 27.0° C., an applied voltage of 10 mV, and a measurement frequency range of 0.1 Hz to 7 MHz is preferably $1.0 \times 10^{-4}$ S·cm$^{-1}$ or higher, more preferably $2.0 \times 10^{-4}$ S·cm$^{-1}$ or higher, still more preferably $3.0 \times 10^{-4}$ S·cm$^{-1}$ or higher, and particularly preferably $4.0 \times 10^{-4}$ S·cm$^{-1}$ or higher. As a result, a sulfide-based inorganic solid electrolyte material having further improved lithium ionic conductivity can be obtained.

(Step (C) of Crystallizing at Least Part of Sulfide-Based Inorganic Solid Electrolyte Material)

Next, the sulfide-based inorganic solid electrolyte material in the glass ceramic state (also referred to as "crystallized glass") is formed by heating the obtained sulfide-based inorganic solid electrolyte material in the vitreous state such that at least a part of the sulfide-based inorganic solid electrolyte material is crystallized. As a result, a sulfide-based inorganic solid electrolyte material having further improved lithium ionic conductivity can be obtained.

That is, from the viewpoint of obtaining excellent lithium ionic conductivity, it is preferable that the sulfide-based inorganic solid electrolyte material according to the present embodiment is in the glass ceramic state (crystallized glass state).

The temperature at which the sulfide-based inorganic solid electrolyte material in the vitreous state is heated is preferably in a range of 220° C. or higher and 500° C. or lower and more preferably in a range of 250° C. or higher and 350° C. or lower.

The time for which the sulfide-based inorganic solid electrolyte material in the vitreous state is heated is not particularly limited as long as it is the time for which the desired sulfide-based inorganic solid electrolyte material in the glass ceramic state can be obtained. For example, the time is in a range of 0.5 hours or longer and 24 hours or shorter and preferably 1 hour or longer and 3 hours or shorter. A heating method is not particularly limited, and examples thereof include a method using a calcination furnace. Conditions such as a temperature or a time during heating can be appropriately adjusted in order to optimize properties of the sulfide-based inorganic solid electrolyte material according to the present embodiment.

In addition, it is preferable that the sulfide-based inorganic solid electrolyte material in the vitreous state is heated, for example, in an inert gas atmosphere. As a result, deterioration (for example, oxidation) of the sulfide-based inorganic solid electrolyte material can be prevented.

Examples of the inert gas when the sulfide-based inorganic solid electrolyte material in the vitreous state is heated include argon gas, helium gas, and nitrogen gas. In order to prevent impurities from being mixed in a product, it is preferable that the purity of the inert gas is as high as possible. In addition, in order to avoid contact with water, the dew point is preferably −70° C. or lower and more preferably −80° C. or lower. A method of introducing the inert gas into the mixed system is not particularly limited as long as it is a method capable of filling the mixed system with the inert gas atmosphere. Examples of the introduction method include a method of purging inert gas and a method continuously introducing inert gas at a given flow rate.

(Step (D) of Crushing, Classifying, or Granulating)

In the method of manufacturing the sulfide-based inorganic solid electrolyte material according to the present embodiment, optionally, the step of crushing, classifying, or granulating the obtained sulfide-based inorganic solid electrolyte material may be further performed. For example, by crushing the sulfide-based inorganic solid electrolyte material into fine particles and adjusting the particle size thereof through a classification operation or a granulation operation, a sulfide-based inorganic solid electrolyte material having a desired particle size can be obtained. The above-described crushing method is not particularly limited, and a well-known crushing method such as a mixer, air flow crushing, a mortar, a tumbling mill, or a coffee mill can be used. In addition, the above-described classification method is not particularly limited, and a well-known method such as a sieve can be used.

From the viewpoint of avoiding contact with water in air, it is preferable that crushing or classification is performed in an inert gas atmosphere or a vacuum atmosphere.

In order to obtain the sulfide-based inorganic solid electrolyte material according to the present embodiment, it is important to appropriately adjust the respective steps. The method of manufacturing the sulfide-based inorganic solid electrolyte material according to the present embodiment is not limited to the above-described method. By appropriately adjusting various conditions, the sulfide-based inorganic solid electrolyte material according to the present embodiment can be obtained.

[Solid Electrolyte]

Next, a solid electrolyte according to the present embodiment will be described. The solid electrolyte according to the present embodiment includes the sulfide-based inorganic solid electrolyte material according to the present embodiment.

The solid electrolyte according to the present embodiment is not particularly limited, and components other than the sulfide-based inorganic solid electrolyte material according to the present embodiment may include various solid electrolyte materials other than the sulfide-based inorganic solid electrolyte material according to the present embodiment within a range where the object of the present invention does not deteriorate.

The solid electrolyte according to the present embodiment may include various solid electrolyte materials other than the sulfide-based inorganic solid electrolyte material according to the present embodiment. The solid electrolyte materials other than the sulfide-based inorganic solid electrolyte material according to the present embodiment are not particularly limited as long as they have ionic conductivity and insulating properties. In general, solid electrolyte materials that are used for a lithium ion battery can be used. Examples of the solid electrolyte materials include: an inorganic solid electrolyte material such as a sulfide-based inorganic solid electrolyte material other than the sulfide-based inorganic solid electrolyte material according to the present embodiment, an oxide-based inorganic solid electrolyte material, or other lithium-based inorganic solid electrolyte materials; and an organic solid electrolyte material such as a polymer electrolyte.

Examples of the sulfide-based inorganic solid electrolyte material other than the sulfide-based inorganic solid electrolyte material according to the present embodiment include a $Li_2S$—$P_2S_5$ material, a $Li_2S$—$SiS_2$ material, a $Li_2S$—$GeS_2$ material, a $Li_2S$—$Al_2S_3$ material, a $Li_2S$—$SiS_2$—$Li_3PO_4$ material, a $Li_2S$—$P_2S_5$—$GeS_2$ material, a $Li_2S$—$Li_2O$—$P_2S_5$—$SiS_2$ material, a $Li_2S$—$GeS_2$—$P_2S_5$—$SiS_2$ material, a $Li_2S$—$SnS_2$—$P_2S_5$—$SiS_2$ material, a $Li_2S$—$P_2S_5$—$Li_3N$ material, a $Li_2S_{2+x}$—$P_4S_3$ material, and a $Li_2S$—$P_2S_5$—$P_4S_3$ material. Among these, one kind may be used singly, or two or more kinds may be used in combination.

Among these, the $Li_2S$—$P_2S_5$ material is preferable from the viewpoint that it has excellent lithium ionic conductivity and has stability to the extent that decomposition or the like does not occur in a wide voltage range. Here, for example, the $Li_2S$—$P_2S_5$ material refers to a solid electrolyte material obtained by a chemical reaction caused by mechanically processing an inorganic composition including at least $Li_2S$ (lithium sulfide) and $P_2S_5$.

Here, in the present embodiment, examples of the lithium sulfide include lithium polysulfide.

Examples of the oxide-based inorganic solid electrolyte material include: a NASICON type such as $LiTi_2(PO_4)_3$, $LiZr_2(PO_4)_3$, or $LiGe_2(PO_4)_3$; a perovskite type such as $(La_{0.5+x}Li_{0.5-3x})TiO_3$; a $Li_2O$—$P_2O_5$ material; and a $Li_2O$—$P_2O_5$—$Li_3N$ material.

Examples of the other lithium-based inorganic solid electrolyte material include LiPON, $LiNbO_3$, $LiTaO_3$, $Li_3PO_4$, $LiPO_{4-x}N_x$ (x satisfies $0<x\leq1$), LiN, LiI, and LISICON.

Further, a glass ceramic obtained by precipitating crystal of the inorganic solid electrolyte materials can also be used as the inorganic solid electrolyte material.

As the organic solid electrolyte material, a polymer electrolyte such as a dry polymer electrolyte or a gel electrolyte can be used.

As the polymer electrolyte, in general, those that are used for a lithium ion battery can be used.

[Solid Electrolyte Membrane]

Next, a solid electrolyte membrane according to the present embodiment will be described.

The solid electrolyte membrane according to the present embodiment includes a solid electrolyte including the sulfide-based inorganic solid electrolyte material according to the present embodiment as a main component.

The solid electrolyte membrane according to the present embodiment is used, for example, as a solid electrolyte layer forming an all-solid-state lithium ion battery.

Examples of the all-solid-state lithium ion battery to which the solid electrolyte membrane according to the present embodiment is applied include an all-solid-state lithium ion battery in which a positive electrode, a solid electrolyte layer, and a negative electrode are stacked in this order. In this case, the solid electrolyte layer is formed of the solid electrolyte membrane.

The average thickness of the solid electrolyte membrane according to the present embodiment is preferably 5 μm or more and 500 μm or less, more preferably 10 μm or more and 200 μm or less, and still more preferably 20 μm or more and 100 μm or less. When the average thickness of the solid electrolyte membrane is the lower limit value or more, the loss of the solid electrolyte or the cracking of the solid electrolyte membrane surface can be further suppressed. In addition, when the average thickness of the solid electrolyte membrane is the upper limit value or less, the impedance of the solid electrolyte membrane can be further decreased. As a result, the battery characteristics of the obtained all-solid-state lithium ion battery can be further improved.

It is preferable that the solid electrolyte membrane according to the present embodiment is a compact obtained by compression-molding the particle-shaped solid electrolyte including the sulfide-based inorganic solid electrolyte material according to the present embodiment. That is, it is preferable that the particle-shaped solid electrolyte is compressed to obtain a solid electrolyte membrane having a given strength due to the anchor effect between the solid electrolyte materials.

By obtaining the compact, the solid electrolytes bind to each other, and the strength of the obtained solid electrolyte membrane can be further improved. As a result, the loss of the solid electrolyte or the cracking of the solid electrolyte membrane surface can be further suppressed.

The content of the sulfide-based inorganic solid electrolyte material according to the present embodiment in the solid electrolyte membrane according to the present embodiment is preferably 50 mass % or higher, more preferably 60 mass % or higher, still more preferably 70 mass % or higher, still more preferably 80 mass % or higher, particularly preferably 90 mass % or higher with respect to 100 mass % of the total mass of the solid electrolyte membrane. As a result, the contact between the solid electrolyte particles can be improved, and the interfacial contact resistance of the solid electrolyte membrane can be decreased. As a result, the lithium ionic conductivity of the solid electrolyte membrane can be further improved. By using the solid electrolyte membrane having excellent lithium ionic conductivity, the battery characteristics of the obtained all-solid-state lithium ion battery can be further improved.

The upper limit of the content of the sulfide-based inorganic solid electrolyte material according to the present embodiment in the solid electrolyte membrane according to the present embodiment is not particularly limited and is, for example, 100 mass % or lower.

The planar shape of the solid electrolyte membrane is not particularly limited and can be appropriately selected according to the shape of an electrode or a current collector. For example, the planar shape is rectangular.

In addition, the solid electrolyte membrane according to the present embodiment may include a binder resin. The content of the binder resin is preferably lower than 0.5 mass %, more preferably 0.1 mass % or lower, still more preferably 0.05 mass % or lower, and still more preferably 0.01 mass % or lower with respect to 100 mass % of the total mass of the solid electrolyte membrane. In addition, it is more preferable that the solid electrolyte membrane according to the present embodiment does not substantially include the binder resin, and it is most preferable that the solid electrolyte membrane according to the present embodiment does not include the binder resin.

As a result, the contact between the solid electrolytes can be improved, and the interfacial contact resistance of the solid electrolyte membrane can be decreased. As a result, the lithium ionic conductivity of the solid electrolyte membrane can be further improved. By using the solid electrolyte membrane having excellent lithium ionic conductivity, the battery characteristics of the obtained all-solid-state lithium ion battery can be improved.

"Substantially not including the binder resin" represents that the binder resin may be included to the extent that the effect of the present embodiment does not deteriorate. In addition, when an adhesive resin layer is provided between the solid electrolyte layer and the positive electrode or the negative electrode, an adhesive resin derived from the adhesive resin layer present in the vicinity of an interface between the solid electrolyte layer and the adhesive resin layer is excluded from "the binder resin in the solid electrolyte membrane".

In order to bind the inorganic solid electrolyte materials to each other, the binder resin refers to a binder that is generally used for a lithium ion battery. Examples of the binder resin include polyvinyl alcohol, polyacrylic acid, carboxymethyl cellulose, polytetrafluoroethylene, polyvinylidene fluoride, styrene-butadiene rubber, and polyimide.

The solid electrolyte membrane according to the present embodiment can be obtained, for example, by depositing the particle-shaped solid electrolyte on a cavity surface of a mold or a substrate surface in a film shape and subsequently compress-molding the solid electrolyte deposited in a film shape.

A method of compress-molding the solid electrolyte is not particularly limited. For example, the particle-shaped solid electrolyte is deposited on a cavity surface of a mold, pressing by a mold and a stamp can be used. When the particle-shaped solid electrolyte is deposited on a substrate surface, pressing by a mold and a stamp, roll pressing, or flat pressing can be used.

The pressure at which the solid electrolyte is compressed is, for example, 10 MPa or higher or 500 MPa or lower.

In addition, optionally, the inorganic solid electrolyte deposited in a film shape may be compressed and heated. When the solid electrolytes are fused and bound to each other by performing the heating and compressing such that the strength of the obtained solid electrolyte membrane can be further improved. As a result, the loss of the solid electrolyte or the cracking of the solid electrolyte membrane surface can be further suppressed.

The temperature at which the solid electrolyte is heated is, for example, 40° C. or higher and 500° C. or lower.

[Lithium Ion Battery]

Figure 1:
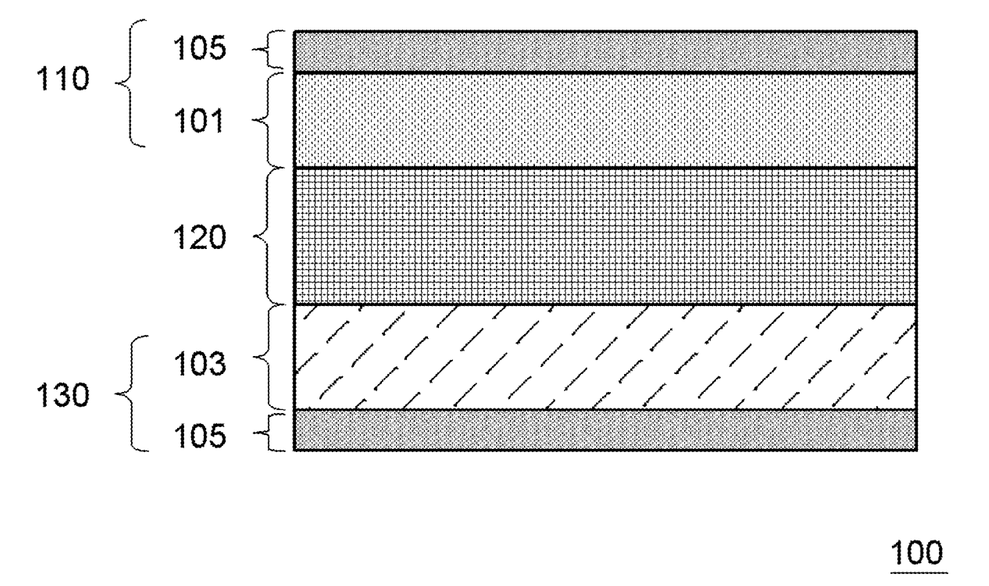
FIG. 1 is a cross-sectional view showing a structure of a lithium ion battery according to an embodiment of the present invention.

FIG. 1 is a cross-sectional view showing a structure of a lithium ion battery 100 according to an embodiment of the present invention.

The lithium ion battery 100 according to the present embodiment includes: a positive electrode 110 including a positive electrode active material layer 101; an electrolyte layer 120; and a negative electrode 130 including a negative electrode active material layer 103. At least one of the positive electrode active material layer 101, the negative electrode active material layer 103, and the electrolyte layer 120 includes the sulfide-based inorganic solid electrolyte material according to the present embodiment. In addition, it is preferable that all of the positive electrode active material layer 101, the negative electrode active material layer 103, and the electrolyte layer 120 include the sulfide-based inorganic solid electrolyte material according to the present embodiment. In the present embodiment, unless specified otherwise, a layer including a positive electrode active material will be referred to as "the positive electrode active material layer 101". Optionally, the positive electrode 110 may or may not further include a current collector 105 in addition to the positive electrode active material layer 101. In addition, in the present embodiment, unless specified otherwise, a layer including a negative electrode active material will be referred to as "the negative electrode active material layer 103". Optionally, the negative electrode 130 may or may not further include the current collector 105 in addition to the negative electrode active material layer 103.

The shape of the lithium ion battery 100 according to the present embodiment is not particularly limited and may be a cylindrical shape, a coin shape, a square shape, a film shape, or any other shape.

The lithium ion battery 100 according to the present embodiment is manufactured using a generally well-known method. For example, the lithium ion battery 100 is prepared by forming a laminate including the positive electrode 110, the electrolyte layer 120, and the negative electrode 130 in a cylindrical shape, a coin shape, a square shape, a film shape, or any other shape and optionally filling the laminate with a non-aqueous electrolytic solution.

(Positive Electrode)

The positive electrode 110 is not particularly limited, and a positive electrode that is generally used for a lithium ion battery can be used. The positive electrode 110 is not particularly limited and can be manufactured using a generally well-known method. For example, the positive electrode 110 can be obtained by forming the positive electrode active material layer 101 including the positive electrode active material on a surface of the current collector 105 such as aluminum foil.

The thickness or density of the positive electrode active material layer 101 is appropriately determined depending on the intended use of the battery and can be set based on generally well-known information.

The positive electrode active material layer 101 includes the positive electrode active material.

The positive electrode active material is not particularly limited, and a generally well-known material can be used. For example, a composite oxide such as a lithium cobalt oxide ($LiCoO_2$), a lithium nickel oxide ($LiNiO_2$), a lithium manganese oxide ($LiMn_2O_4$), a solid solution oxide ($Li_2MnO_3$—$LiMO_2$ (M=Co, Ni, or the like)), lithium-manganese-nickel oxide ($LiNi_{1/3}Mn_{1/3}Co_{1/3}O_2$), or an olivine-type lithium phosphate ($LiFePO_4$); a conductive polymer such as polyaniline or polypyrrole; a sulfide-based positive electrode active material such as $Li_2S$, CuS, a Li—Cu—S compound, $TiS_2$, FeS, $MoS_2$, a Li—Mo—S compound, a Li—Ti—S compound, a Li—V—S compound, or a Li—Fe—S compound; or a material including sulfur as an active material such as acetylene black impregnated with sulfur, porous carbon impregnated with sulfur, or mixed powder including sulfur and carbon can be used. Among these positive electrode active materials, one kind may be used singly, or two or more kinds may be used in combination.

Among these, from the viewpoints obtaining higher discharge capacity density and obtaining higher cycle characteristics, a sulfide-based positive electrode active material is preferable, and one kind or two or more kinds selected from a Li—Mo—S compound, a Li—Ti—S compound, and a Li—V—S compound are more preferable.

Here, the Li—Mo—S compound includes Li, Mo, and S as constituent elements and can be typically obtained by a chemical reaction caused by mechanically processing an inorganic composition including molybdenum sulfide and lithium sulfide as raw materials.

In addition, the Li—Ti—S compound includes Li, Ti, and S as constituent elements and can be typically obtained by a chemical reaction caused by mechanically processing an inorganic composition including titanium sulfide and lithium sulfide as raw materials.

The Li—V—S compound includes Li, V, and S as constituent elements and can be typically obtained by a chemical reaction caused by mechanically processing an inorganic composition including vanadium sulfide and lithium sulfide as raw materials.

The positive electrode active material layer 101 is not particularly limited and may include, as components other than the positive electrode active material, for example, one or more materials selected from a binder resin, a thickener, a conductive auxiliary agent, a solid electrolyte material, and the like. Hereinafter, the respective materials will be described.

The positive electrode active material layer 101 may include a binder resin having a function of binding the positive electrode active materials to each other and binding the positive electrode active material and the current collector 105 to each other.

The binder resin according to the present embodiment is not particularly limited as long as it is a typical binder resin that can be used for a lithium ion battery. Examples of the binder resin include polyvinyl alcohol, polyacrylic acid, carboxymethyl cellulose, polytetrafluoroethylene, polyvinylidene fluoride, styrene-butadiene rubber, and polyimide. Among the binders, one kind may be used singly, or two or more kinds may be used in combination.

From the viewpoint of securing the fluidity of a slurry suitable for application, the positive electrode active material layer 101 may include a thickener. The thickener is not particularly limited as long as it is a typical thickener that can be used for a lithium ion battery. Examples of the thickener include a cellulose polymer such as carboxymethyl cellulose, methyl cellulose, or hydroxypropyl cellulose and an ammonium salt and an alkali metal salt thereof; and a water-soluble polymer such as polycarboxylic acid, polyethylene oxide, polyvinyl pyrrolidone, polyacrylate, or polyvinyl alcohol. Among the thickeners, one kind may be used singly, or two or more kinds may be used in combination.

From the viewpoint of improving the conductivity of the positive electrode 110, the positive electrode active material layer 101 may include a conductive auxiliary agent. The conductive auxiliary agent is not particularly limited as long as it is a typical conductive auxiliary agent that can be used for a lithium ion battery. Examples of the conductive auxiliary agent include a carbon black such as Acetylene black or Ketjen black and a carbon material such as a vapor-grown carbon fiber.

The positive electrode according to the present embodiment may include a solid electrolyte including the sulfide-based inorganic solid electrolyte material according to the present embodiment or may include a solid electrolyte including a solid electrolyte material other than the sulfide-based inorganic solid electrolyte material according to the present embodiment. The solid electrolyte material other than the sulfide-based inorganic solid electrolyte material according to the present embodiment are not particularly limited as long as they have ionic conductivity and insulating properties. In general, a solid electrolyte material that is used for a lithium ion battery can be used. Examples of the solid electrolyte material include: an inorganic solid electrolyte material such as a sulfide-based inorganic solid electrolyte material, an oxide-based inorganic solid electrolyte material, or other lithium-based inorganic solid electrolyte materials; and an organic solid electrolyte material such as a polymer electrolyte. More specifically, the inorganic solid electrolyte material described above regarding the description of the solid electrolyte according to the present embodiment can be used.

The mixing ratio between various materials in the positive electrode active material layer 101 is appropriately determined depending on the intended use of the battery and can be set based on generally well-known information.

(Negative Electrode)

The negative electrode 130 is not particularly limited, and a negative electrode that is generally used for a lithium ion battery can be used. The negative electrode 130 is not particularly limited and can be manufactured using a generally well-known method. For example, the negative electrode 130 can be obtained by forming the negative electrode active material layer 103 including the negative electrode active material on a surface of the current collector 105 such as copper.

The thickness or density of the negative electrode active material layer 103 is appropriately determined depending on the intended use of the battery and can be set based on generally well-known information.

The negative electrode active material layer 103 includes the negative electrode active material.

The negative electrode active material is not particularly limited as long as it is a typical negative electrode active material that can be used for a negative electrode of a lithium ion battery. Examples of the negative electrode active material include: a carbon material such as natural graphite, artificial graphite, resinous coal, carbon fiber, activated charcoal, hard carbon, or soft carbon; a metal material mainly formed of lithium, a lithium alloy, tin, a tin alloy, silicon, a silicon alloy, gallium, a gallium alloy, indium, an indium alloy, aluminum, or an aluminum alloy; a conductive polymer such as polyacene, polyacetylene, or polypyrrole; and a lithium titanium composite oxide (for example, $Li_4Ti_5O_{12}$). Among these negative electrode active materials, one kind may be used singly, or two or more kinds may be used in combination.

The negative electrode active material layer 103 is not particularly limited and may include, as components other than the negative electrode active material, for example, one or more materials selected from a binder resin, a thickener, a conductive auxiliary agent, a solid electrolyte material, and the like. These materials are not particularly limited, and examples thereof are the same as those of the materials used for the positive electrode 110.

The mixing ratio between various materials in the negative electrode active material layer 103 is appropriately determined depending on the intended use of the battery and can be set based on generally well-known information.

(Electrolyte Layer)

Next, the electrolyte layer 120 will be described. The electrolyte layer 120 is a layer formed between the positive electrode active material layer 101 and the negative electrode active material layer 103.

Examples of the electrolyte layer 120 include a separator impregnated with a non-aqueous electrolytic solution and a solid electrolyte layer including a solid electrolyte.

The separator according to the present embodiment is not particularly limited as long as it has a function of electrically insulating the positive electrode 110 and the negative electrode 130 to allow transmission of lithium ions. For example, a porous membrane can be used.

As the porous membrane, a microporous polymer film is suitably used, and examples of a material thereof include polyolefin, polyimide, polyvinylidene fluoride, and polyester. In particular, a porous polyolefin film is preferable, and specific examples thereof include a porous polyethylene film and a porous polypropylene film.

The non-aqueous electrolytic solution is obtained by dissolving an electrolyte in a solvent.

As the electrolyte, any well-known lithium salt can be used, and the electrolyte may be selected depending on the kind of the active material. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, LiCl, LiBr, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and a lithium lower aliphatic carboxylate.

The solvent in which the electrolyte is dissolved is not particularly limited as long as it is typically used as a liquid in which the electrolyte is dissolved. Examples of the solvent include: carbonates such as ethylene carbonate (EC), propylene carbonate (PC), butylene carbonate (BC), dimethyl carbonate (DMC), diethyl carbonate (DEC), methyl ethyl carbonate (MEC), or vinylene carbonate (VC); lactones such as γ-butyrolactone or γ-valerolactone; ethers such as trimethoxy methane, 1,2-dimethoxyethane, diethyl ether, 2-ethoxy ethane, tetrahydrofuran, or 2-methyl tetrahydrofuran; sulfoxides such as dimethyl sulfoxide; oxolanes such as 1,3-dioxolane or 4-methyl-1,3-dioxolane; nitrogen-containing solvents such as acetonitrile, nitromethane, formamide, or dimethylformamide; organic acid esters such as methyl formate, methyl acetate, ethyl acetate, butyl acetate, methyl propionate, or ethyl propionate; phosphate triesters or diglymes; triglymes; sulfolanes such as sulfolane or methyl sulfolane; oxazolidinones such as 3-methyl-2-oxazolidinone; and sultones such as 1,3-propanesultone, 1,4-butanesultone, or naphthasultone. Among these, one kind may be used singly, or two or more kinds may be used in combination.

The solid electrolyte layer according to the present embodiment is a layer formed between the positive electrode active material layer 101 and the negative electrode active material layer 103, and is formed of a solid electrolyte including a solid electrolyte material. The solid electrolyte in the solid electrolyte layer is not particularly limited as long as it has lithium ionic conductivity. In the present embodiment, it is preferable that the solid electrolyte includes the sulfide-based inorganic solid electrolyte material according to the present embodiment.

The content of the solid electrolyte in the solid electrolyte layer according to the present embodiment is not particularly limited as long as it has a proportion where desired insulating properties can be obtained. For example, the content of the solid electrolyte is in a range of 10 vol % or higher and 100 vol % or lower and preferably in a range of 50 vol % or higher and 100 vol % or lower. In particular, in the present embodiment, it is preferable that the solid electrolyte layer is formed of only the solid electrolyte including the sulfide-based inorganic solid electrolyte material according to the present embodiment.

In addition, the solid electrolyte layer according to the present embodiment may include a binder resin. By including the binder resin, a flexible solid electrolyte layer can be obtained. Examples of the binder resin include a fluorine-containing binder such as polytetrafluoroethylene or polyvinylidene fluoride. The thickness of the solid electrolyte layer is, for example, in a range of 0.1 μm or more and 1000 μm or less and preferably in a range of 0.1 μm or more and 300 μm or less.

Hereinafter, the embodiment of the present invention has been described. However, the embodiment is merely an example of the present invention, and various configurations other than the above-described configurations can also be adopted.

In addition, the present invention is not limited to the above-described embodiments, and modifications, improvements, and the like within a range where the object of the present invention can be achieved are included in the present invention.

EXAMPLES

Hereinafter, the present invention will be described in more detail using Examples and Comparative Examples. However, the present invention is not limited to these Examples and Comparative Examples.

[1] Measurement Method

First, a measurement method in the following Examples and Comparative Examples will be described.

(1) Particle Size Distribution

The particle size distribution of a sulfide-based inorganic solid electrolyte material obtained in each of Examples and Comparative Examples was measured with a laser diffraction method using a laser diffraction scattering particle size distribution analyzer (manufactured by Malvern Panalytical Ltd., Mastersizer 3000). Based on the measurement result, a particle size corresponding to a 50% cumulative value ($D_{50}$, average particle size) in the weight cumulative distribution of the sulfide-based inorganic solid electrolyte material was obtained.

(2) Measurement of Composition Ratio in Sulfide-Based Inorganic Solid Electrolyte Material Mass % of each of Li, P, and S in the sulfide-based inorganic solid electrolyte material obtained in each of Examples and Comparative Examples was obtained by ICP Emission Spectroscopy using an ICP emission spectrometer (SPS3000, manufactured by Seiko Instruments Inc.). Based on the obtained values, a molar ratio between the respective elements was calculated.

(3) X-Ray Diffraction Analysis

Using an X-ray diffractometer (manufactured by Rigaku Corporation, RINT2000), each of diffraction spectra of lithium nitride compositions obtained in Examples and Comparative Examples was obtained by X-ray diffraction analysis. A cuKα ray was used as a radiation source. Here, a diffraction intensity of a diffraction peak present at a position of a diffraction angle $2\theta=23.0\pm0.3°$ was represented by $I_\alpha$, a diffraction intensity of a diffraction peak present at a position of a diffraction angle $2\theta=32.0\pm0.3°$ was represented by $I_\beta$, $I_\beta/I_\alpha$ was obtained.

(4) Measurement of Lithium Ionic Conductivity

In each of the sulfide-based inorganic solid electrolyte material obtained in each of Examples and Comparative Examples, the lithium ionic conductivity was measured using an alternating current impedance method.

For the measurement of the lithium ionic conductivity, a potentiostat/galvanostat SP-300 (manufactured by Bio-Logic Sciences Instruments) was used. The size of the sample was diameter: 9.5 mm and thickness: 1.2 to 2.0 mm. Measurement conditions were applied voltage: 10 mV, measurement temperature: 27.0° C., and measurement frequency range: 0.1 Hz to 7 MHz, and electrode: Li foil.

Here, 150 mg of the powdery sulfide-based inorganic solid electrolyte material obtained in each of Examples and Comparative Examples was pressed using a press machine at 270 MPa for 10 minutes, and the plate-shaped sulfide-based inorganic solid electrolyte material having a diameter of 9.5 mm and a thickness of 1.2 to 2.0 mm was obtained and used as the sample for the measurement of the lithium ionic conductivity.

(5) Measurement of Maximum Value of Oxidative Decomposition Current 120 to 150 mg of the powdery sulfide-based inorganic solid electrolyte material obtained in each of Examples and Comparative Examples was pressed using a press machine at 270 MPa for 10 minutes to obtain a plate-shaped sulfide-based inorganic solid electrolyte material (pellet) having a diameter of 9.5 mm and a thickness of 1.3 mm. Next, Li foil as a reference electrode or counter electrode was pressed against on one surface of the obtained pellet under conditions of 18 MPa and 10 minutes, and SUS314 foil as a working electrode adhered closely to another surface of the pellet.

Next, using a potentiostat/galvanostat SP-300 (manufactured by Bio-Logic Sciences Instruments), a maximum value of an oxidative decomposition current of the sulfide-based inorganic solid electrolyte material was measured under conditions of a temperature of 25° C., a sweep voltage range of 0 to 5 V, and a voltage sweep rate of 5 mV/sec and was evaluated based on the following criteria.

A: 0.03 µA or lower
B: higher than 0.03 µA and 0.50 µA or lower
C: higher than 0.50 µA

[2] Manufacturing of Sulfide-Based Inorganic Solid Electrolyte Material

The sulfide-based inorganic solid electrolyte material was prepared according to the following procedure.

Regarding the raw materials, $Li_2S$ (manufactured by Furukawa Co., Ltd., purity: 99.9%) and $P_2S_5$ (manufactured by Kanto Chemical Co., Inc.) were used, and $Li_3N$ obtained in each of Examples and Comparative Examples was used as $Li_3N$.

Next, in an argon glove box, $Li_2S$ powder, $P_2S_5$ powder, and $Li_3N$ powder were weighed ($Li_2S:P_2S_5:Li_3N=27:9:2$ (molar ratio)), and these powders were mixed in an agate mortar for 10 minutes.

Next, 2 g of the mixed powder was weighed, was put into a zirconia pot (inner volume: 45 mL) with 18 zirconia balls having a diameter φ of 10 mm, and was crushed and mixed (mechanochemical process) using a planetary ball mill (rotation: 800 rpm, revolution: 400 rpm) for 6 hours, 12 hours, or 16 hours.

Next, after crushing and mixing, the powder attached to an inner wall of the pot or the balls was scraped, the powder was put again into the pot together with balls, and was crushed and mixed using a planetary ball mill (rotation: 800 rpm, revolution: 400 rpm) for the same time as described above. As a result, the sulfide-based inorganic solid electrolyte material ($Li_{10}P_3S_{12}$) in the vitreous state was obtained.

Next, the sulfide-based inorganic solid electrolyte material in the vitreous state was annealed in argon at 290° C. for 2 hours. As a result, the sulfide-based inorganic solid electrolyte material ($Li_{10}P_3S_{12}$) in the glass ceramic state was obtained.

The lithium ionic conductivity of each of the obtained sulfide-based inorganic solid electrolyte materials in the glass ceramic state was measured. The obtained results are shown in Table 1.

[3] Manufacturing of $Li_3N$

Example 1

First, in a glove box in a nitrogen atmosphere, Li foil (manufactured by Honjo Metal Co., Ltd., purity: 99.8%, thickness: 0.5 mm) was drawn using a rotating twin roll formed of Duracon, and a fresh part in the Li foil was exposed. The Li foil started to be changed into dark purple in color from the surface, and by leaving the Li foil to stand at room temperature for 24 hours, then entire area of the Li foil was changed into dark purple $Li_3N$.

Next, 50 g of the obtained $Li_3N$ foil and 500 g of zirconia balls having a diameter φ of 10 mm were put into a 400 ml alumina pot and were crushed at a rotation speed of 120 rpm for 48 hours. The obtained powdery $Li_3N$ was annealed in argon at 350° C. for 2 hours to obtain a lithium nitride composition. Regarding the obtained lithium nitride composition, each of evaluations was performed. The obtained results are shown in Table 1.

Examples 2 and 3

Lithium nitride compositions were obtained using the same method as that of Example 1, except that the crushing mixing time when the sulfide-based inorganic solid electrolyte material in the vitreous state was obtained was changed to the time shown in Table 1, and each of the evaluations was performed. The obtained results are shown in Table 1.

Comparative Examples 1 to 3

First, in a glove box in a nitrogen atmosphere, Li foil (manufactured by Honjo Metal Co., Ltd., purity: 99.8%, thickness: 0.5 mm) was drawn using a rotating twin roll formed of Duracon, and a fresh part in the Li foil was exposed. The Li foil started to be changed into dark purple in color from the surface, and by leaving the Li foil to stand at room temperature for 24 hours, then entire area of the Li foil was changed into dark purple $Li_3N$.

Next, 50 g of the obtained Li3N foil and 500 g of zirconia balls having a diameter $\phi$ of 10 mm were put into a 400 ml alumina pot and were crushed at a rotation speed of 120 rpm for a predetermined time shown in Table 1. Regarding the obtained lithium nitride composition, each of evaluations was performed. The obtained results are shown in Table 1.

TABLE 1

| | Intensity at 2θ = 23.0 ± 0.3° [$I_\alpha$] | Intensity at 2θ = 32.0 ± 0.3° [$I_\beta$] | $I_\beta/I_\alpha$ | Crushing Li3N Phase | Crushing Mixing Time [h] | Annealing Conditions | Composition Ratio Li/P [-] | Composition Ratio S/P [-] | Crushing Mixing Time [h] | $D_{50}$ [μm] | Lithium Ionic Conductivity [S·cm$^{-1}$] | Maximum Value of Oxidative Decomposition Current |
|---|---|---|---|---|---|---|---|---|---|---|---|---|
| Example 1 | 7941.7 | 160.0 | 0.02 | α | 48 | 350° C. × 2 h | 3.3 | 4.0 | 6 | 19 | $1.58 \times 10^{-3}$ | A |
| Example 2 | 7941.7 | 160.0 | 0.02 | α | 48 | 350° C. × 2 h | 3.3 | 4.0 | 12 | 20 | $1.60 \times 10^{-3}$ | A |
| Example 3 | 7941.7 | 160.0 | 0.02 | α | 48 | 350° C. × 2 h | 3.3 | 4.0 | 16 | 17 | $1.44 \times 10^{-3}$ | A |
| Comparative Example 1 | 268.3 | 1353.3 | 5.04 | β | 144 | — | 3.3 | 4.0 | 12 | 18 | $1.35 \times 10^{-3}$ | A |
| Comparative Example 2 | 268.3 | 1353.3 | 5.04 | β | 144 | — | 3.3 | 4.0 | 16 | 19 | $1.17 \times 10^{-3}$ | A |
| Comparative Example 3 | 282.1 | 1321.1 | 4.68 | α + β | 120 | — | 3.3 | 4.0 | 12 | 19 | $1.23 \times 10^{-3}$ | A |

In the sulfide-based inorganic solid electrolyte material obtained by using the lithium nitride composition according to each of Examples as a raw material, the lithium ionic conductivity was higher than that of the sulfide-based inorganic solid electrolyte material obtained by using the lithium nitride composition according to each of Comparative Examples as a raw material.

The present application claims priority based on Japanese Patent Application No. 2019-066564 filed on Mar. 29, 2019, the entire content of which is incorporated herein by reference.

REFERENCE SIGNS LIST

100: lithium ion battery
101: positive electrode active material layer
103: negative electrode active material layer
105: current collector
110: positive electrode
120: electrolyte layer
130: negative electrode

The invention claimed is:

1. A method of manufacturing a lithium nitride composition for a sulfide-based inorganic solid electrolyte material, the method comprising:
a step of nitriding lithium foil in a nitrogen gas;
a step of mechanically processing the obtained lithium nitride foil such that the lithium nitride foil is powdery; and
a step of annealing the obtained powdery lithium nitride,
wherein the lithium nitride composition comprises α-lithium nitride
wherein in a spectrum obtained by X-ray diffraction in which a CuKα ray is used as a radiation source, when a diffraction intensity of a diffraction peak present at a position of a diffraction angle 2θ=23.0±0.3° is represented by $I_\alpha$ and a diffraction intensity of a diffraction peak present at a position of a diffraction angle 2θ=32.0±0.3° is represented by $I_\beta$,
a value of $I_\beta/I_\alpha$ is 4.50 or lower; and
wherein the temperature during the nitriding reaction of the lithium foil is in a range of 10° C. or higher and 120° C. or lower.

2. The method of manufacturing the lithium nitride composition according to claim 1,
wherein the value of $I_\beta/I_\alpha$ is 0.001 or higher.

3. The method of manufacturing the lithium nitride composition according to claim 1,
wherein a total content of the α-lithium nitride and β-lithium nitride in the lithium nitride composition is 95 mass % or higher.

4. The method of manufacturing the lithium nitride composition according to claim 1,
wherein the lithium nitride composition is powdery.

5. The method of manufacturing the lithium nitride composition according to claim 1,
wherein in the annealing step, the powdery lithium nitride is heated at 200° C. or higher and 500° C. or lower in an inert gas atmosphere.

6. A method of manufacturing a sulfide-based inorganic solid electrolyte material, the method comprising:
a step of obtaining the lithium nitride composition by the method of manufacturing the lithium nitride composition according to claim 1;
a step of preparing a raw material composition of a sulfide-based inorganic solid electrolyte material comprising the lithium nitride composition, lithium sulfide, and phosphorus sulfide; and
a step of mechanically processing the raw material composition of the sulfide-based inorganic solid electrolyte material.

* * * * *